United States Patent [19]

Jordan

[11] 4,367,378

[45] Jan. 4, 1983

[54] TELEPHONE AND HOLDING BAND THEREFOR

[76] Inventor: Arthur A. Jordan, Rockledge, 20 Shore Rd., Magnolia, Mass. 01930

[21] Appl. No.: 175,550

[22] Filed: Aug. 5, 1980

[51] Int. Cl.³ ............................................. H04M 1/05
[52] U.S. Cl. ............................................. 179/156 R
[58] Field of Search ............... 179/156 R, 156 A, 157

[56] References Cited

U.S. PATENT DOCUMENTS

| | | | |
|---|---|---|---|
| 2,360,027 | 10/1944 | Werner | 179/156 A |
| 2,447,470 | 8/1948 | Valentine | 179/156 R |
| 2,653,193 | 9/1953 | Anderson | 179/156 R |
| 2,676,213 | 4/1954 | Anderson | 179/156 R |
| 2,802,062 | 8/1957 | Dalton | 179/157 |
| 2,998,497 | 8/1961 | May | 179/156 A |
| 3,000,384 | 9/1961 | Piers, Jr. | 24/17 R |
| 3,083,737 | 4/1963 | DeMestral | 24/204 |
| 3,087,028 | 4/1963 | Bonnin | 179/156 R |
| 3,136,854 | 6/1964 | Willick | 179/156 R |
| 3,196,511 | 7/1965 | Kintner | 2/323 |
| 3,787,641 | 1/1974 | Santori | 179/156 R |
| 3,850,393 | 11/1974 | Marquard | 248/102 |
| 3,869,584 | 3/1975 | Wilde | 179/156 R |
| 3,894,464 | 7/1975 | Brooks | 84/327 |
| 3,943,572 | 3/1976 | Aileo | 179/156 R |
| 3,994,048 | 11/1976 | Rosenthal | 24/306 |
| 4,048,453 | 9/1977 | Seidel | 179/156 R |
| 4,103,808 | 8/1978 | Hallman et al. | 224/168 |
| 4,112,521 | 9/1978 | Uke | 2/452 |
| 4,121,061 | 10/1978 | Donaldson | 179/156 R |

*Primary Examiner*—George G. Stellar
*Attorney, Agent, or Firm*—James A. Wong

[57] ABSTRACT

A telephone handset in combination with an elastic band attached thereto and forming an endless assembly which may be placed around a person's head so that the telephone handset need not be held by hand wherein the telephone unit comprises a transmitter, a receiver, and an intermediate body portion interconnecting the transmitter and the receiver, and wherein the telephone handset includes first fastening members and the elastic band includes second fastening members cooperating with the first fastening members to detachably secure the elastic band to the telephone handset and form the endless assembly. The fastening members are of plastic eye and hook formation.

3 Claims, 2 Drawing Figures

TELEPHONE AND HOLDING BAND THEREFOR

BACKGROUND OF THE INVENTION

1. Field of the Invention

This invention relates to an improved telephone arrangement and holding band therefor which, when used in the manner intended as described hereinbelow, will securely support the telephone unit and free the user's hands for domestic or office chores, for taking notes, or the like while the user is carrying on a conversation.

2. Brief Description of the Prior Art

Prior endeavors have been made by others to provide means for supporting a telephone on a person's head to free the user's hands while enabling the person to simultaneously carry on a conversation. While the prior endeavors may work well to varying degrees, the invention disclosed and claimed herein has been made with an aim to providing flexibility and adjustability along with comfort and operability. Of the prior art known to applicant, U.S. Pat. No. 4,048,453 of Seidel and U.S. Pat. No. 4,121,061 of Donaldson are believed to constitute the most relevant prior art. The telephone holder or support member of both Seidel and of Donaldson include a relatively rigid headband connected to one end of a telephone transmitter-receiver unit, which headband is adapted to be rigidly clamped over a person's head with the telephone speaker-receiver suspended from one end of the headband.

SUMMARY OF THE INVENTION

With the above limitations in mind, applicant has conceived the improvements disclosed and claimed herein to provide a flexible, yet functional telephone support device which will afford the user with greater comfort.

Another object of the present invention is to provide an improved telephone support band which is readily adjustable as to size.

Yet another object of the present invention is to provide a new and improved telephone construction whereby a support member may be readily included or removed as desired without the use of tools, mechanical hardware or by removing parts of the telephone.

Still another object of the present invention is to provide a new and improved telephone support member which will readily adapt to the shape of a person's head.

Another object of the present invention is to provide an inexpensive telephone support.

A further object of the present invention is to provide a secure support at both the speaker end and at the receiver end of the telephone.

Yet another object of the present invention is to provide a flexible device so that many users of the same telephone will need little or no adjustment.

Still another object of the present invention is to afford a user with substantially complete freedom of the head.

Another object of the present invention is to afford a user the option to either use the device or not without removing the device from the telephone speaker-receiver unit while conversing.

Still another object of the present invention is to afford a user with mobility, such as walking, bending, turning, and the like, limited only by the telephone cord length while engaged in conversation.

BRIEF DESCRIPTION OF THE DRAWINGS

Referring briefly to the drawing, the reader will readily appreciate that.

DETAILED DESCRIPTION

Figure 1:
FIG. 1 represents a view in perspective of applicant's telephone and support band arrangement placed around a person's head according to the disclosed inventive concept.
Figure 2:
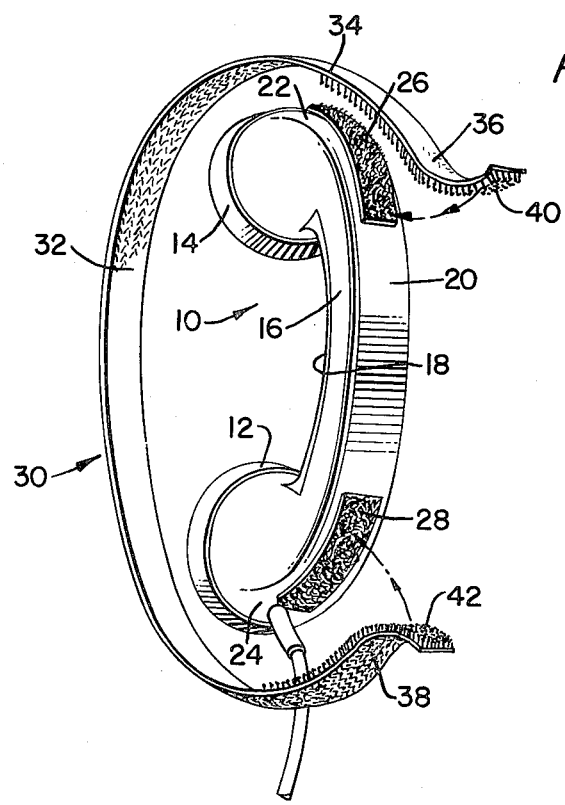
FIG. 2 represents a view in perspective and on a slightly enlarged scale showing applicant's support band disposed in position with opposite ends thereof ready to be placed in secured relationship with cooperative members on the outer periphery of opposite ends of a telephone speaker-receiver unit.

Referring now in detail to the drawings, the reader will readily see from FIGS. 1 and 2 that a preferred embodiment of applicant's inventive concept is embodied in a conventional rigid one-piece telephone handset unit 10 comprising a transmitter 12, a receiver 14, and an elongated intermediate body portion 16 integral with and interconnecting the transmitter 12 and the receiver 14 between the respective opposite ends 22, 24 thereof. The elongated body portion 16 may be readily seen to include a first peripheral surface 18 which is directed toward the face of a person using the telephone handset unit 10 and a second peripheral surface 20 opposite from the first peripheral surface 18 wherein the second peripheral surface 20 is provided with fastening means 26, 28 of plastic hook or eye construction adjacent opposite ends 22, 24, respectively, so that a support band 30 or the like may be attached to the telephone handset unit 10 by fastening means 26, 28. The support band 30 is provided with plastic eye or hook elements 40, 42 on one side 32, adjacent respective opposite ends 36, 38 thereof so that the eye or hook elements 40, 42 are detachably secured to plastic hook or eye construction 26, 28, respectively, on the back or peripheral surface 20 of speaker-receiver unit 10.

As may be clearly seen in FIG. 1, the first peripheral surface 18 is placed adjacent to a person's head or face in normal usage and at the same time the second peripheral surface 20 extends outwardly away from a person's head or face during usage. Support band 30 preferably is made of an elastic material so that the assembly thereof with telephone handset unit 10 will be flexible and conform to the shape of a person's head. The hook or eye fastening means 26, 28 adjacent to opposite ends 22, 24 of telephone handset unit 10 and the cooperating eye or hook elements 40, 42 on opposite ends 36, 38 of support band 30 are available and known commercially as Velcro. To expand or contract the circumference of the assembly of phone transmitter-receiver handset unit 10 and support band 30, either or both ends 36, 38 may be applied to transmitter-receiver handset 10 closer or farther from the ends 22, 24 of handset 10 as desired.

Having handset 10 in one hand and support band 30 in the other hand, a person need only move end 36 of support band 30 in the direction of the dotted arrows on the underside thereof as shown in FIG. 2 to engage the eye or hook elements 40 with the hook or eye construction 26 on the back side of receiver 14 at end 22; then place receiver 14 against one ear while locating transmitter 12 against the chin and adjacent the mouth; and finally move end 38 of support band 30 in the direction of the dotted arrows extending therefrom to engage the eye or hook elements 42 with the hook or eye construction 28 on the back side of transmitter 12 at end 24. In attaching end 38 of band 30 to end 24 of handset 10, the user needs only to apply sufficient tension to band 30 so as to cause band 30 to conform to the shape of the head and also to firmly secure handset 10 therearound thus leaving the hands free for various tasks.

It will be obvious to those skilled in the art that various changes may be made without departing from the scope of the invention and the invention is not to be considered limited to what is shown in the drawings and described in the specification.

What is claimed is:

1. A rigid one-piece telephone handset unit in combination with an elastic band attached thereto and forming an endless assembly which may be placed around a person's head so that the telephone handset unit need not be held by hand wherein said telephone handset unit comprises a transmitter, a receiver, and an intermediate body portion integrally with and interconnecting said transmitter and said receiver and wherein said telephone handset unit includes first fastening means in the form of a plurality of plastic hook or eye elements on the back side of said handset behind said transmitter and said receiver and said elastic band includes second fastening means in the form of a plurality of plastic eye or hook elements cooperating with said first fastening means to detachably secure said elastic band to said telephone unit and form said endless assembly with which one may hold a phone receiver against one's ear and the transmitter adjacent one's chin and mouth.

2. A conventional rigid one-piece telephone handset unit in combination with a support band wherein said handset unit comprises:
   a. a transmitter;
   b. a receiver; and
   c. an elongated intermediate body portion interconnecting said transmitter and said receiver adjacent opposite ends thereof;

said elongated body portion having a first peripheral surface which is directed toward the face of a person using said telephone handset unit and a second peripheral surface opposite from said first peripheral surface wherein said second peripheral surface is provided with fastening means in the form of a plurality of plastic hook or eye elements adjacent opposite ends thereof so that said support band or the like may be attached to said telephone handset unit, said support band having cooperating fastening means in the form of a plurality of plastic eye or hook elements on one side and adjacent opposite ends thereof whereby said eye or hook elements of said support band are detachably secured to said plastic hook or eye elements of said handset unit to form an endless assembly which may extend over the top of the head and under the chin of a user with said first periheral surface being placed adjacent to the user's face in normal usage and said second peripheral surface extending outwardly away from the user's face during usage, with said receiver being held against the user's ear and said transmitter adjacent the user's mouth.

3. The combination as defined in claim 2 wherein said support band is made of an elastic material.

* * * * *